United States Patent [19]
Haugwitz et al.

[11] 3,723,424
[45] Mar. 27, 1973

[54] PYRAZOLE DERIVATIVES

[75] Inventors: Rudiger D. Haugwitz, Highland Park; Venkatachala L. Narayanan, Highstown, both of N.J.

[73] Assignee: E. R. Squibb & Sons, Inc., New York, N.Y.

[22] Filed: July 28, 1971

[21] Appl. No.: 166,972

[52] U.S. Cl............260/243 R, 260/306.7, 424/246, 424/270
[51] Int. Cl..............................................C07d 93/06
[58] Field of Search.......................260/243 R, 306.7

[56] References Cited

UNITED STATES PATENTS

| | | | |
|---|---|---|---|
| 2,577,409 | 12/1951 | Emerson et al | 260/243 |
| 3,499,083 | 3/1970 | Levitt | 260/243 X |

FOREIGN PATENTS OR APPLICATIONS

| | | | |
|---|---|---|---|
| 1,253,002 | 11/1971 | Great Britain | 260/243 |

*Primary Examiner*—John M. Ford
*Attorney*—Lawrence S. Levinson et al.

[57] ABSTRACT

Pyrazole derivatives are provided having the structure

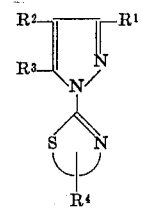

and which are useful as anthelmintic agents.

7 Claims, No Drawings

PYRAZOLE DERIVATIVES

The present invention relates to pyrazole derivatives having the structure

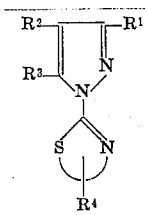

(I)

wherein $R^1$, $R^2$ and $R^3$ may be the same or different and can be hydrogen, lower alkyl, aryl, cyano, or halogen, and $R^4$ is hydrogen, lower alkyl or aryl.

The radical

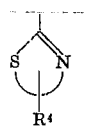

represents a five- or six-membered ring containing three or four carbon atoms, respectively, wherein the additional two or three carbon atoms (not shown) may have attached an $R^4$ substituent, other than hydrogen, as indicated above.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below.

The term "halogen" includes each of the four halogens, but chlorine is preferred.

The term "aryl" includes monocyclic or bicyclic monovalent aromatic ring systems such as phenyl or naphthyl. These aryl radicals can include as substituents halogen, nitro or any of the alkyl groups mentioned hereinbefore.

Examples of compounds falling within the present invention include the following:

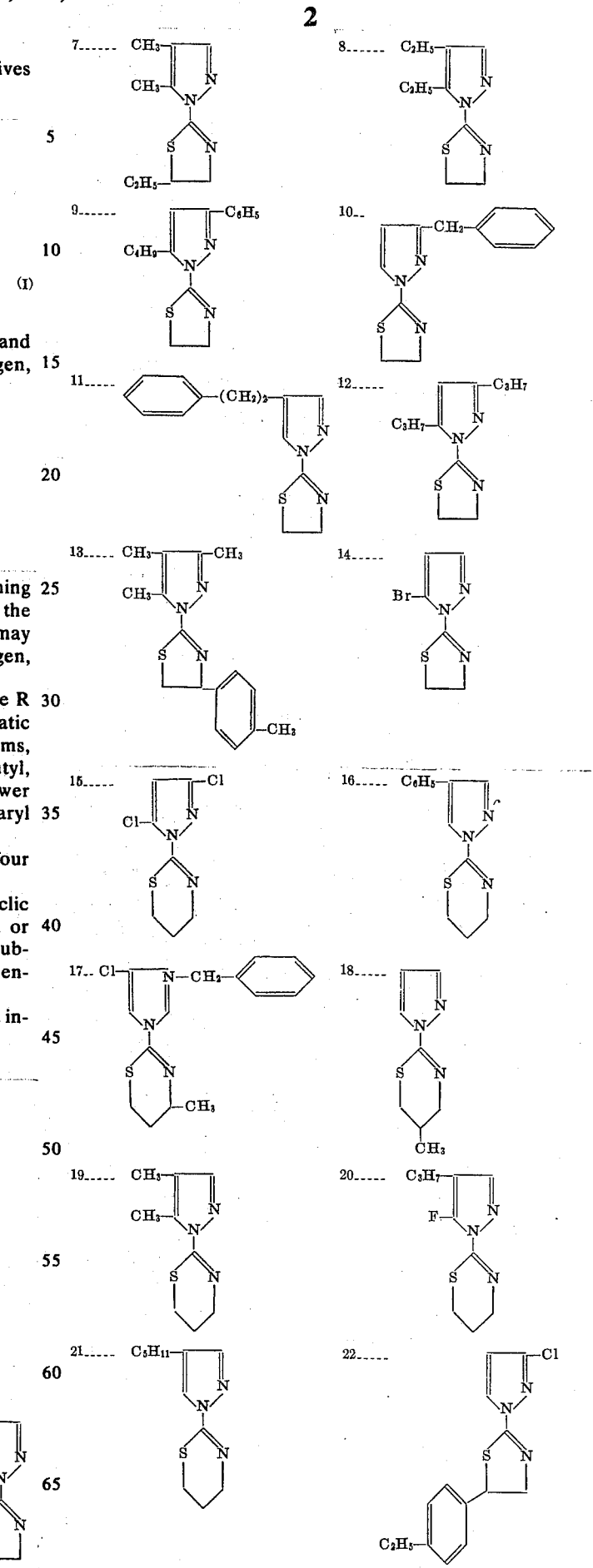

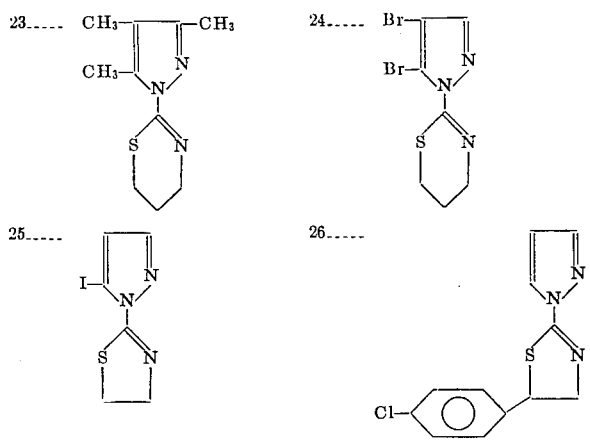

Compounds of Formula (I) can be prepared by first converting the pyrazole (II) into its salt (III) by reacting (II) with a base such as a metal hydride, for example sodium hydride, Na/liquid ammonia, an alkali metal alkoxide, such as sodium methoxide, potassium ethoxide or sodium t-butoxide or a metal amide such as sodium amide.

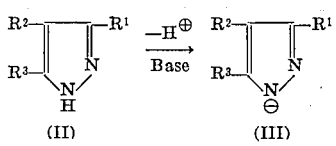

The above reaction can be brought about in a variety of aprotic solvents such as aromatic hydrocarbons, e.g., benzene, toluene or xylene or ethers such as ethyl ether or glyme, at temperatures ranging from about 0° to about 150° for periods of about 1 hour to 24 hours. A slight excess of the base is desirable; thus the ratio of pyrazole (II) to base can range from about 1:1 to about 1:2.

The salt (III) is reacted with an aliphatic haloalkylisothiocyanate (IV) to yield thiourea (V) which undergoes intramolecular alkylation to form the novel pyrazoles (I).

The above reactions are outlined below.

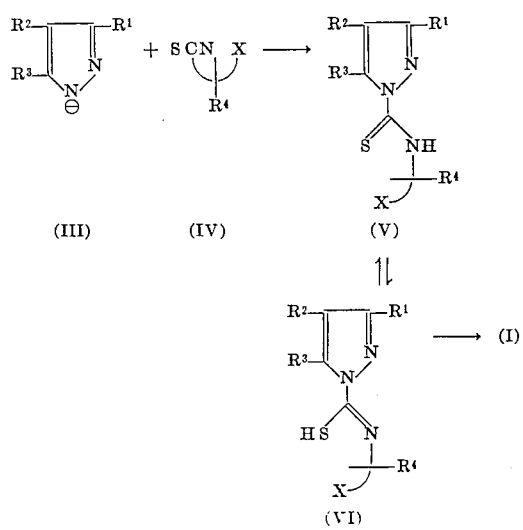

wherein X is Cl or Br.

The ratio of pyrazole to haloalkylisothiocyanate can range from 1:1 to 1:3. The reaction time can vary from about 1 to about 10 hours. The reaction can be carried out at temperatures ranging from about 35° to about 150°.

The preparation of a variety of pyrazoles is well documented in Elderfield's, *Heterocyclic Compounds*, Volume 5, pp. 45–193, John Wiley and Sons, Inc., New York, 1957.

It is to be understood that unsubstituted pyrazole (III), that is where $R^1$, $R^2$ and $R^3$ are hydrogen, can be employed to form compounds of Formula (I) and thereafter any of the other R radicals can be inserted in the pyrazole ring in place of one or two hydrogens, employing conventional procedures as will be apparent to one skilled in the art.

Haloalkylisothiocyanates (IV) are readily synthesized from their corresponding haloalkyl amines (VII) and thiophosgene:

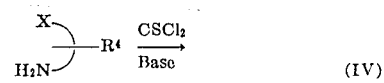

Additional routes toward compounds of structure (IV) are described in Houben-Weyl's *Methoden Der Organischen Chemie*, Volume 9, G. Thieme Verlag Stuttgart, 1955.

It is to be understood that pyrazoles containing a free imino hydrogen are virtually tautomeric systems and react like tautomeric mixtures of the two possible forms.

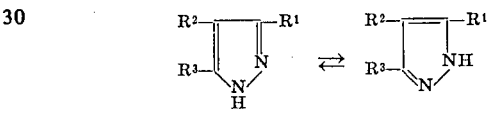

Their reaction products, namely, the compounds of Formula (I) of the invention are not necessarily obtained in equal parts but in proportions which differ from compound to compound.

Examples of pyrazole starting materials (II) which can be employed herein included the following:

TABLE A

|    | $R^1$ | $R^2$ | $R^3$ |
|----|-------|-------|-------|
| 1. | H | H | $CH_3$ |
| 2. | Cl | $C_6H_5$ | Cl |
| 3. | $C_6H_5$ | $C_6H_5CH_2$ | H |
| 4. | $C_6H_5CH_2-$ | $CH_3$ | $-C_6H_5$ (p-Cl) |
| 5. | H | $C_4H_9$ | $C_4H_9$ |
| 6. | $C_6H_5C_2H_4-$ | CN | H |
| 7. | CN | Cl | H |
| 8. | $C_6H_{13}$ | H | Cl |
| 9. | $CH_3$ | Br | CN |
| 10. | F | CN | H |
| 11. | Br | H | $C_3H_7$ |
| 12. | H | H | Br |
| 13. | Cl | H | $C_6H_5$ |
| 14. | CN | H | H |

Examples of aliphatic haloalkylisothiocyanates which can be employed herein include the following:

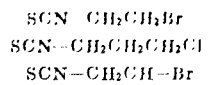

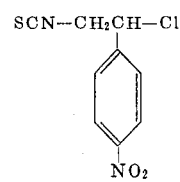

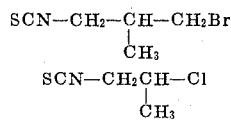

The compounds of Formula (I) form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The pyrazoles described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular pyrazole compound being employed, on the severity of the infection and on the particular species of animal to be treated. In general, the pyrazoles exhibit anthelmintic activity when administered to animals in a daily dose of about 50 to about 300 mg. per kilogram of animal body weight. It is preferred to employ in the range of 100-200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10-70 mg. per kilogram of body weight. The pyrazoles may be incorporated in the animal feeds, and this method of administration is preferred when the compounds are to be used prophylactically, in which case they are incorporated in the feeds at concentrations such that the animal will consume daily from about 10 to about 70 mg. of pyrazole per kilogram of body weight.

The means employed for administering these pyrazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the pyrazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2-10 grams and containing from 1-5 grams of the anthelmintic agent. These boluses, as well as smaller size tablets, contain binder and lubricants, and are compounded by techniques known in this art. Capsules are readily prepared by mixing the active ingredient with a diluent such as starch or lactose and filling into the capsule.

In order to treat infected animals by means of a drench, the pyrazoles are mixed with a suspending agent such as bentonite and the solid product added to water just prior to administration. The preferred drenches in accordance with this invention contain from about 5-50 percent by weight of pyrazole compound.

The pyrazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the pyrazoles intimately dispersed in or admixed with an inert carrier or diluent, i.e., one that is nonreactive with respect to the pyrazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5 percent to about 50 percent by weight, and preferably from about 10–30 percent by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate pyrazole with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0 percent in the feed. One advantageous method of administering the compounds of this invention to animals whose feeds are conveniently pelleted, such as sheep, is to incorporate them directly in the pellets. For instance, pyrazole is readily incorporated in nutrionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the pyrazoles may be incorporated in salt licks or salt blocks at any desired concentration (concentrations of 5–25 percent by weight are conveniently employed). Large animals such as sheep, cattle and goats, then receive the anthelmintics with their salt.

The pyrazole derivatives of the invention are also useful as anti-inflammatory agents. They may be used to decrease joint swelling, tenderness, pain and stiffness in mammalian species, e.g., in conditions such as rheumatoid arthritis. Compounds of Formula (I) may be compounded for such use according to accepted pharmaceutical practice in oral dosage forms such as tablets, capsules, elixirs or powders for administration of about 100 mg. to 2 gm. per day, preferably 100 mg. to 1 gm. per day in two to four divided doses.

The following examples further illustrate and represent preferred embodiments of the invention.

EXAMPLE 1

1-(2-thiazolin-2-yl)pyrazole

To a solution of 5.0 g. (0.07 mole) pyrazole in about 100 ml of dry glyme there is added 2.5 g. sodium hydride (50 percent mineral oil dispersion) and the mixture is stirred for 45 minutes at room temperature. There is then added 8.8 g. 2-chloroethylisothiocyanate in 10 ml dry glyme and the mixture refluxed for 2 hours. The solvent is removed under vacuum and water is added to the residue. The resulting solid is filtered off, dried and crystallized from Et$_2$O/pet.-ether to yield 3.5 g., mp 67°–68.5°.

Anal. Calcd. for $C_6H_7N_3S$: C, 47.07; H, 4.61; N, 27.43

Found: C, 47.26; H, 4.86; N, 27.63.

EXAMPLE 2

3-Methyl-1-(2-thiazolin-2-yl)pyrazole

Following the procedure of Example 1, but substituting an equivalent amount of 3-methylpyrazole, the title compound is obtained.

EXAMPLE 3

5-Ethyl-1-(2-thiazolin-2-yl)pyrazole

Following the procedure of Example 1, but substituting an equivalent amount of 5-ethylpyrazole for pyrazole, the title compound is obtained.

EXAMPLE 4

4-Chloro-1-(2-thiazolin-2-yl)pyrazole

Following the procedure of Example 1, but substituting an equivalent amount of 4-chloropyrazole for pyrazole, the title compound is obtained.

EXAMPLE 5

1-(5,6-Dihydro-4H-1,3-thiazin-2-yl)pyrazole

Following the procedure of Example 1, but substituting an equivalent amount of 3-bromopropylisothiocyanate for 2-chloroethylisothiocyanate, the title compound is obtained.

EXAMPLES 6 to 19

In accordance with the procedure of the foregoing examples, but substituting the pyrazole shown in Column 1 of Table I below and the aliphatic haloalkylisothiocyanate shown in Column 2, the product shown in Column 3 is obtained.

TABLE I

| Column 1 | Column 2 | Column 3 |
|---|---|---|
| 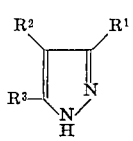 | |  |

| Example | $R^1$ | $R^2$ | $R^3$ | Haloalkylisothiocyanate | $R^1$ | $R^2$ | $R^3$ | $R^4$ |
|---|---|---|---|---|---|---|---|---|
| 6 | H | H | H | SCN—CH$_2$CHCl<br>\|<br>C$_6$H$_5$ | H | H | H | 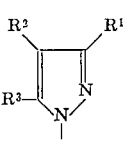<br> |

TABLE I—Continued

| | Column 1 | | | Column 2 | Column 3 | | | |
|---|---|---|---|---|---|---|---|---|
| Example | $R^1$ | $R^2$ | $R^3$ | Haloalkylisothiocyanate | $R^1$ | $R^2$ | $R^3$ | $R^4$ |
| 7 | $C_6H_5$ | $CH_3$ | H | $SCN-CH_2-CH_2Br$ | $C_6H_5$ | $CH_3$ | H | (thiazoline) |
| 8 | $C_2H_5$ | H | $C_2H_5$ | $SCN-CHCH_2Cl$ <br> \|<br> $CH_3$ | $C_2H_5$ | H | $C_2H_5$ | (thiazoline-$CH_3$) |
| 9 | $CH_3$ | $CH_3$ | $CH_3$ | $SCN-CH_2CH_2Cl$ | $CH_3$ | $CH_3$ | $CH_3$ | (thiazoline) |
| 10 | CN | H | H | $SCN-CH_2CH_2Br$ | CN | H | H | (thiazoline) |
| 11 | H | Cl | CN | $SCN-CH_2CH_2Cl$ | H | Cl | CN | (thiazoline) |
| 12 | $C_6H_5C_2H_4-$ | CN | Cl | $SCN-CHCH_2-Br$ <br> \|<br> $C_2H_5$ | $C_6H_5C_2H_4-$ | CN | Cl | (thiazoline-$C_2H_5$) |
| 13 | Br | H | H | $SCN-CH_2CH_2Cl$ | Br | H | H | (thiazoline) |
| 14 | H | Cl | Cl | $SCNCH_2CH_2Cl$ | H | Cl | Cl | (thiazoline) |
| 15 | p-$C_2H_5C_6H_4$ | $CH_3$ | $C_2H_5$ | $SCNCH_2CH_2CH_2Br$ | p-$C_2H_5C_6H_4$ | $CH_3$ | $C_2H_5$ | (thiazine) |
| 16 | $C_4H_9$ | CN | H | $SCNCH_2CH_2CH_2Cl$ | $C_4H_9$ | CN | H | (thiazine) |
| 17 | H | H | CN | $SCNCH_2CH_2CHBR$ <br> \|<br> $C_6H_5$ | H | H | CN | (thiazine-$C_6H_5$) |
| 18 | $C_5H_{11}$ | H | $C_5H_{11}$ | $SCNCH_2CH_2CHCl$ <br> \|<br> $C_6H_5$ | $C_5H_{11}$ | H | $C_5H_{11}$ | (thiazine-$C_6H_5$) |

TABLE I—Continued

| | Column 1 | Column 2 | Column 3 | | | |
|---|---|---|---|---|---|---|
| Example | $R^1$ | $R^2$ | $R^3$ | Haloalkylisothiocyanate | $R^1$ | $R^2$ | $R^3$ | $R^4$ |
| 19 | H | CN | CN | $SCNCH_2CH_2CH_2Br$ | H | CN | CN | |

What is claimed is:

1. A compound of the structure

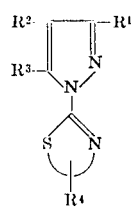

wherein $R^1$, $R^2$ and $R^3$ can be the same or different and are selected from the group consisting of hydrogen, lower alkyl, aryl, cyano or halogen, $R^4$ is selected from the group consisting of hydrogen, lower alkyl, or aryl,

represents a five- or six-membered ring, aryl is a mono- or bi- carbocyclic aromatic ring system of six to 10 carbon atoms; and physiologically acceptable acid-addition salts thereof.

2. A compound as defined in claim 1 having the structure

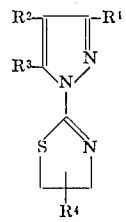

3. A compound as defined in claim 1 having the structure

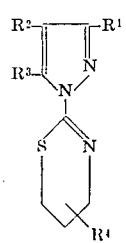

4. A compound as defined in claim 1 having the structure

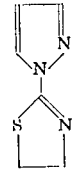

5. A compound as defined in claim 1 having the structure

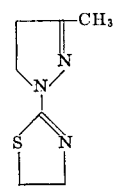

6. A compound as defined in claim 1 having the structure

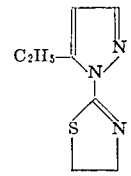

7. A compound as defined in claim 1 having the structure

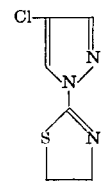

* * * * *